United States Patent
Lee et al.

(10) Patent No.: US 11,184,938 B2
(45) Date of Patent: Nov. 23, 2021

(54) METHOD AND DEVICE FOR REQUESTING RRC CONNECTION

(71) Applicant: LG ELECTRONICS INC., Seoul (KR)

(72) Inventors: Youngdae Lee, Seoul (KR); Hongsuk Kim, Seoul (KR); Jaewook Lee, Seoul (KR); Sangwon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 85 days.

(21) Appl. No.: 16/497,420

(22) PCT Filed: Mar. 23, 2018

(86) PCT No.: PCT/KR2018/003406
§ 371 (c)(1),
(2) Date: Sep. 24, 2019

(87) PCT Pub. No.: WO2018/174625
PCT Pub. Date: Sep. 27, 2018

(65) Prior Publication Data
US 2021/0120618 A1 Apr. 22, 2021

Related U.S. Application Data

(60) Provisional application No. 62/475,906, filed on Mar. 24, 2017, provisional application No. 62/487,534, filed on Apr. 20, 2017.

(51) Int. Cl.
*H04W 76/19* (2018.01)
*H04W 76/11* (2018.01)
*H04W 76/27* (2018.01)

(52) U.S. Cl.
CPC ............ *H04W 76/19* (2018.02); *H04W 76/11* (2018.02); *H04W 76/27* (2018.02)

(58) Field of Classification Search
CPC ..... H04W 76/10; H04W 76/11; H04W 76/15; H04W 76/16; H04W 76/19; H04W 76/20;
(Continued)

(56) References Cited

U.S. PATENT DOCUMENTS 10,897,708 B2 * 1/2021 Shih ................. H04W 36/0005
10,945,303 B2 * 3/2021 Ohlsson ................ H04W 12/06
(Continued)

FOREIGN PATENT DOCUMENTS

EP 2645804 10/2013
KR 20090053745 5/2009
(Continued)

OTHER PUBLICATIONS

PCT International Application No. PCT/KR2018/003406, International Search Report dated Jun. 20, 2018, 16 pages.

*Primary Examiner* — Jean A Gelin
(74) *Attorney, Agent, or Firm* — Lee, Hong, Degerman, Kang & Waimey

(57) ABSTRACT

Provided are a method for a terminal requesting a radio resource control (RRC) connection in a wireless communication system, and a device supporting same. The method may comprise the steps of: receiving a UE ID from a first cell; determining whether the UE ID is valid; and transmitting an RRC connection resume request message including the UE ID to a second cell if the terminal determines that the UE ID is valid.

20 Claims, 15 Drawing Sheets

(58) Field of Classification Search
CPC ..... H04W 76/30; H04W 76/27; H04W 76/18; H04W 76/28; H04W 76/29; H04W 4/70; H04W 72/048; H04W 68/00; H04W 68/06; H04W 36/0033; H04W 36/305
See application file for complete search history.

(56) References Cited

U.S. PATENT DOCUMENTS

| | | | | |
|---|---|---|---|---|
| 2009/0135775 | A1* | 5/2009 | Ou | H04W 74/0841 370/329 |
| 2013/0260810 | A1* | 10/2013 | Rayavarapu | H04W 76/19 455/509 |
| 2015/0098366 | A1* | 4/2015 | Wu | H04B 7/2656 370/278 |
| 2015/0117287 | A1* | 4/2015 | Kim | H04W 72/0453 370/311 |
| 2016/0212638 | A1 | 7/2016 | Jain et al. | |
| 2018/0035420 | A1* | 2/2018 | Centonza | H04W 72/048 |
| 2018/0091485 | A1* | 3/2018 | Lee | H04W 12/043 |
| 2018/0220487 | A1* | 8/2018 | Wu | H04W 76/27 |
| 2018/0310358 | A1* | 10/2018 | Li | H04W 52/0209 |
| 2018/0332462 | A1* | 11/2018 | Kim | H04W 28/02 |
| 2019/0021128 | A1* | 1/2019 | Sivavakeesar | H04W 4/70 |
| 2019/0052435 | A1* | 2/2019 | Martin | H04L 5/0032 |
| 2019/0059119 | A1* | 2/2019 | Hapsari | H04W 76/10 |
| 2019/0124711 | A1* | 4/2019 | Dai | H04W 76/20 |
| 2019/0150218 | A1* | 5/2019 | Futaki | H04W 80/08 370/329 |
| 2019/0319686 | A1* | 10/2019 | Chen, IV | H04W 48/20 |
| 2019/0349883 | A1* | 11/2019 | Fujishiro | H04W 76/11 |
| 2019/0357272 | A1* | 11/2019 | Lim | H04W 68/02 |

FOREIGN PATENT DOCUMENTS

| | | |
|---|---|---|
| KR | 20120067937 | 6/2012 |
| KR | 20150099742 | 9/2015 |

* cited by examiner

FIG. 3
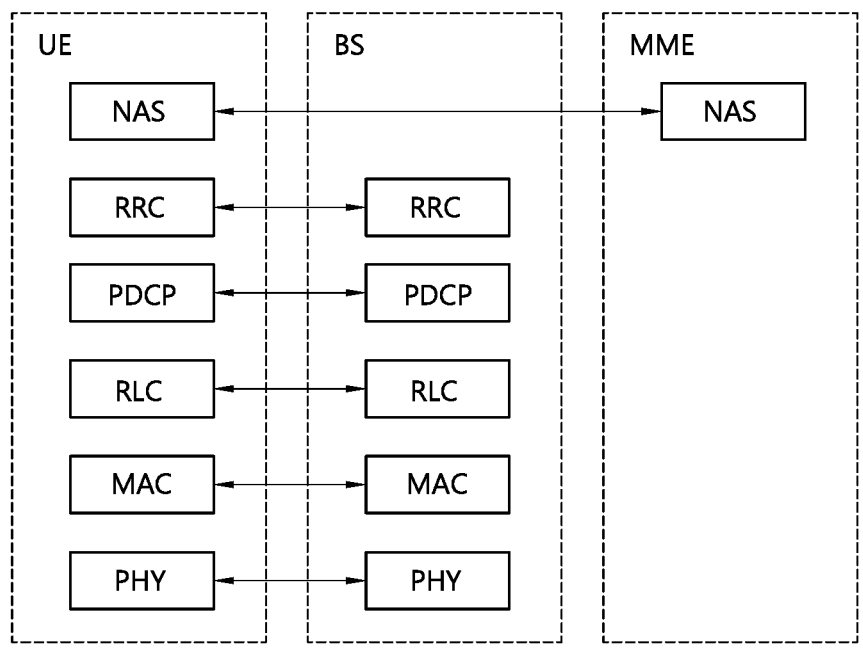
(a)
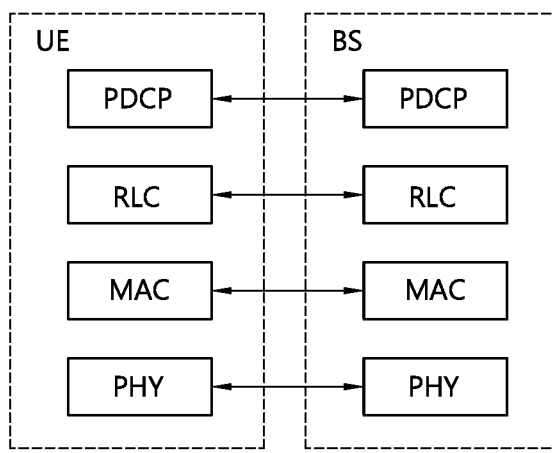
(b)

METHOD AND DEVICE FOR REQUESTING RRC CONNECTION

CROSS-REFERENCE TO RELATED APPLICATIONS

This application is the National Stage filing under 35 U.S.C. 371 of International Application No. PCT/KR2018/003406, filed on Mar. 23, 2018, which claims the benefit of U.S. Provisional Application No. 62/475,906, filed on Mar. 24, 2017, and 62/487,534, filed on Apr. 20, 2017, the contents of which are all hereby incorporated by reference herein in their entirety.

BACKGROUND OF THE DISCLOSURE

Field of the Disclosure

The present disclosure relates to a wireless communication system, and more particularly, to a method for a terminal requesting a radio resource control (RRC) connection and an apparatus for supporting the same.

Related Art

In order to meet the demand for wireless data traffic, which has been increasing since the commercialization of a fourth-generation (4G) communication system, efforts are being made to develop an improved fifth-generation (5G) communication system or pre-5G communication system. For this reason, a 5G communication system or pre-5G communication system is referred to as a beyond-4G-network communication system or post-long-term evolution (LTE) system.

SUMMARY OF THE DISCLOSURE

Meanwhile, in the RRC connection re-establishment procedure, the UE needs to wait for a first RRC connection reconfiguration message to resume all suspended DRBs. This may cause unnecessary latency and high possibility of data loss. This is because the UE cannot resume all the suspended DRBs as soon as the RRC connection re-establishment is completed. Therefore, an enhanced RRC connection re-establishment procedure needs to be proposed.

In an aspect, a method for a terminal requesting a radio resource control (RRC) connection in a wireless communication system is provided. The method may include: receiving a UE ID from a first cell; determining whether the UE ID is valid; and transmitting an RRC connection resume request message including the UE ID to a second cell if the UE determines that the UE ID is valid.

In another aspect, a user equipment (UE) for requesting a radio resource control (RRC) connection in a wireless communication system is provided. The UE includes: a memory; a transceiver; and a processor connecting between the memory and the transceiver, in which the processor is configured to control the transceiver to receive a UE ID from a first cell, determine whether the UE ID is valid; and control the transceiver to transmit an RRC connection resume request message including the UE ID to a second cell if it is determined that the UE ID is valid.

The UE may efficiently control a radio bearer.

BRIEF DESCRIPTION OF THE DRAWINGS

FIG. 3 shows a control plane and a user plane of a radio interface protocol of an LTE system.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE. 5G communication system is an evolution of the LTE-A.

For clarity, the following description will focus on LTE-A. However, technical features of the present disclosure are not limited thereto.

Figure 1:
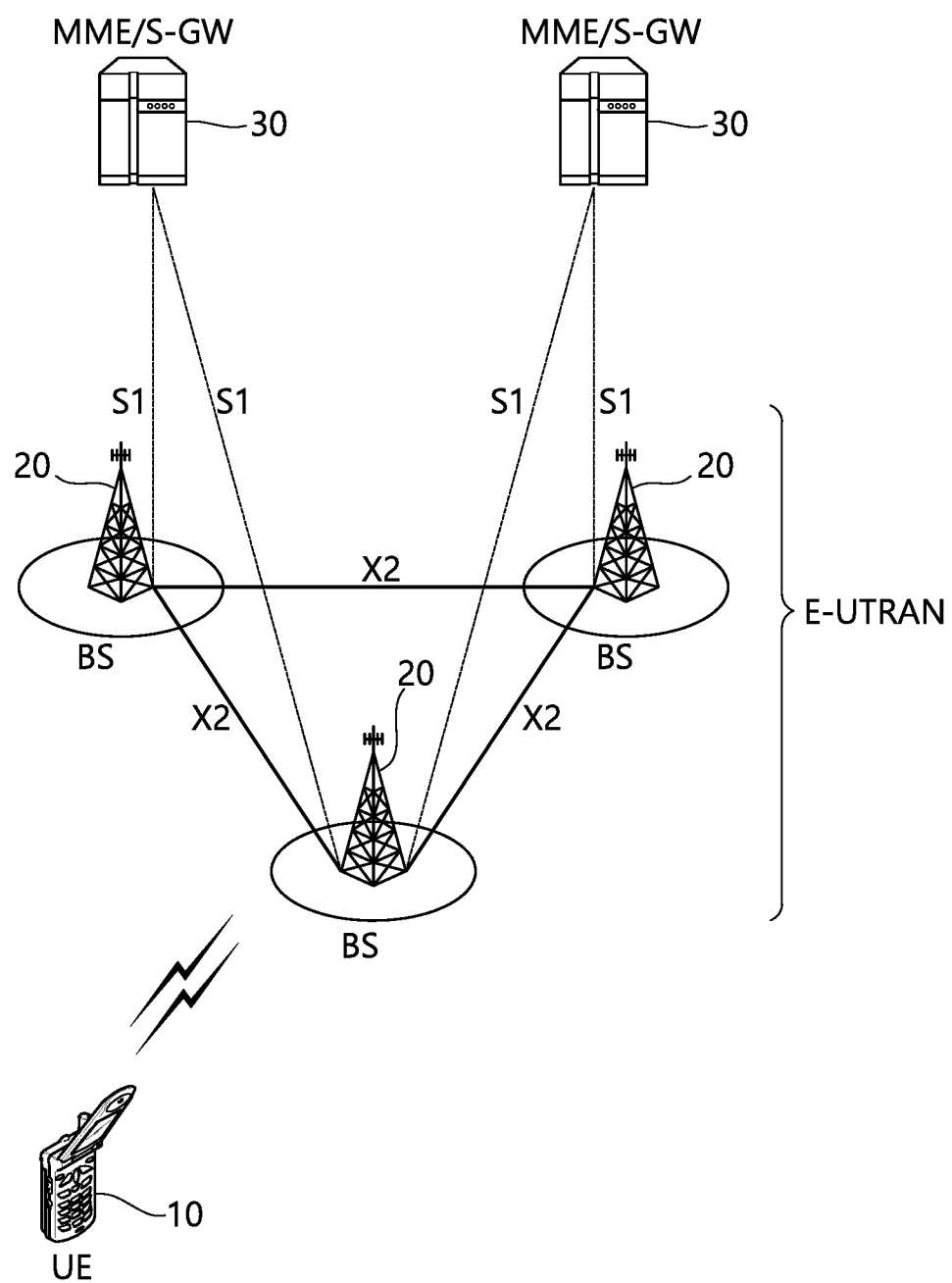
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
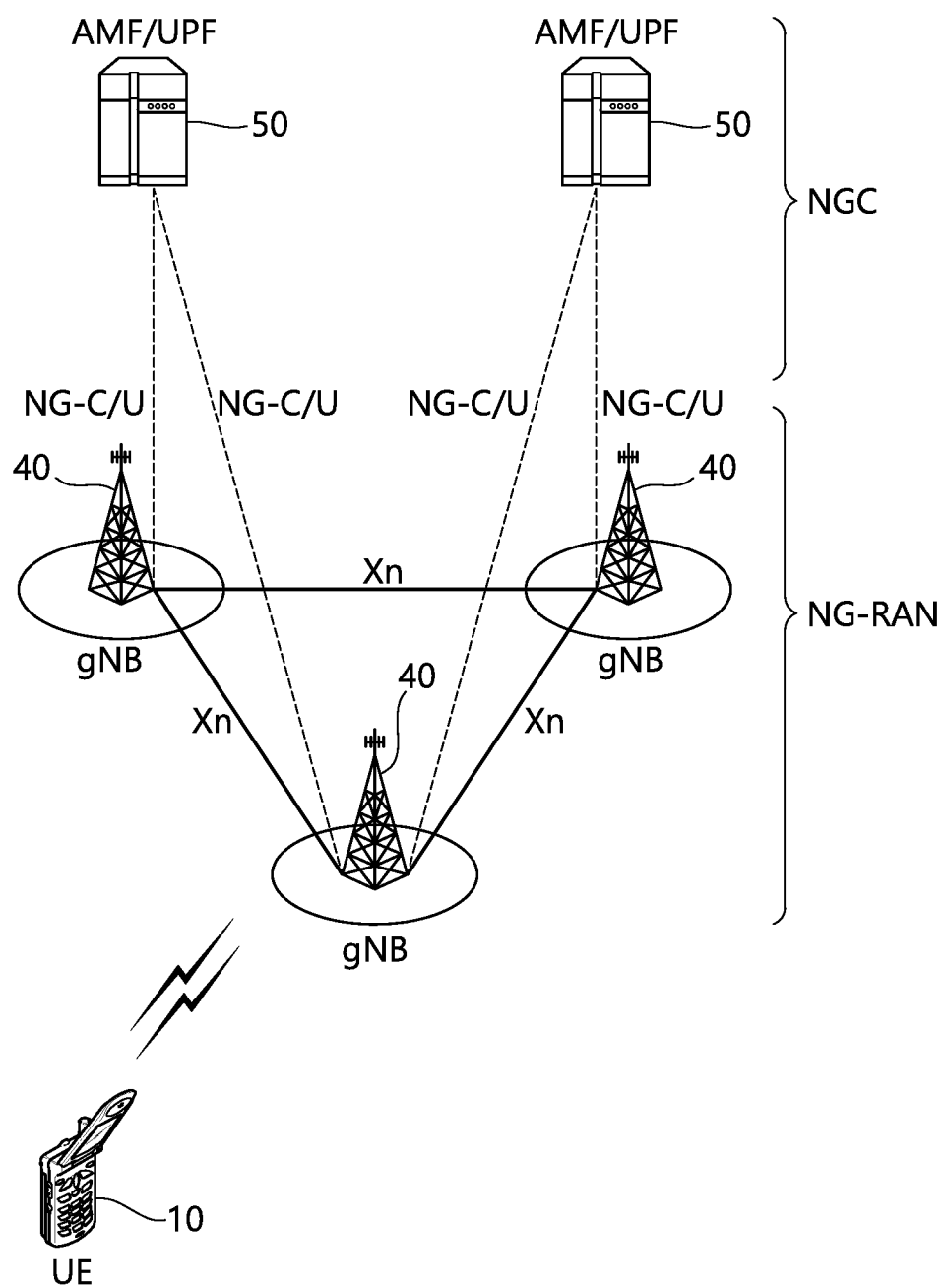
FIG. 2 shows a structure of a 5G system.

FIG. 2 shows a structure of a 5G system.

In case of an evolved packet core (EPC) having a core network structure of the existing evolved packet system (EPS), a function, a reference point, a protocol, or the like is defined for each entity such as a mobility management entity (MME), a serving gateway (S-GW), a packet data network gateway (P-GW), or the like.

On the other hand, in case of a 5G core network (or a NextGen core network), a function, a reference point, a protocol, or the like is defined for each network function (NF). That is, in the 5G core network, the function, the reference point, the protocol, or the like is not defined for each entity.

Referring to FIG. 2, the 5G system structure includes at least one UE (10), a next generation-radio access network (NG-RAN), and a next generation core (NGC).

The NG-RAN may include at least one gNB (40), and a plurality of UEs may be present in one cell. The gNB (40) provides the UE with end points of the control plane and the user plane. The gNB (40) is generally a fixed station that communicates with the UE (10) and may be referred to as another terminology, such as a base station (BS), a base transceiver system (BTS), an access point, or the like. One gNB (40) may be arranged in every cell. At least one cell may be present in a coverage of the gNB (40).

The NGC may include an access and mobility function (AMF) and a session management function (SMF) which are responsible for a function of a control plane. The AMF may be responsible for a mobility management function, and the SMF may be responsible for a session management function. The NGC may include a user plane function (UPF) which is responsible for a function of a user plane.

Interfaces for transmitting user traffic or control traffic may be used. The UE (10) and the gNB (40) may be connected by means of a Uu interface. The gNBs (40) may be interconnected by means of an X2 interface. Neighboring gNBs (40) may have a meshed network structure based on an Xn interface. The gNBs (40) may be connected to an NGC by means of an NG interface. The gNBs (40) may be connected to an AMF by means of an NGC interface, and may be connected to a UPF by means of an NG-U interface.

The NG interface supports a many-to-many-relation between the gNB (40) and the AMF/UPF (50).

A gNB host may perform functions such as functions for radio resource management, IP header compression and encryption of user data stream, selection of an AMF at UE attachment when no routing to an AMF can be determined from the information provided by the UE, routing of user plane data towards UPF(s), scheduling and transmission of paging messages (originated from the AMF), scheduling and transmission of system broadcast information (originated from the AMF or O&M), or measurement and measurement reporting configuration for mobility and scheduling.

An access and mobility function (AMF) host may perform primary functions such as NAS signaling termination, NAS signaling security, AS security control, inter CN node signaling for mobility between 3GPP access networks, idle mode UE reachability (including control and execution of paging retransmission), tracking area list management (for UE in idle and active mode), AMF selection for handovers with AMF change, access authentication, or access authorization including check of roaming rights.

A user plane function (UPF) host may perform primary functions such as anchor point for Intra-/inter-RAT mobility (when applicable), external PDU session point of interconnect to data network, packet routing & forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, UL/DL rate enforcement, uplink traffic verification (SDF to QoS flow mapping), transport level packet marking in the uplink and downlink, or downlink packet buffering and downlink data notification triggering.

A session management function (SMF) host may perform primary functions such as session management, UE IP address allocation and management, selection and control of UP function, configuring traffic steering at UPF to route traffic to proper destination, controlling part of policy enforcement and QoS, or downlink data notification.

FIG. 3 shows a control plane and a user plane of a radio interface protocol of an LTE system. FIG. 3(a) shows a control plane of a radio interface protocol of an LTE system. FIG. 3(b) shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A Non-Access Stratum (NAS) layer placed over the RRC layer performs functions, such as session management and mobility management.

Referring to FIG. 3(*a*), the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3(*b*), the RLC and MAC layers (terminated in the eNB on the network side) may perform the same functions for the control plane. The PDCP layer (terminated in the eNB on the network side) may perform the user plane functions such as header compression, integrity protection, and ciphering.

Figure 4:
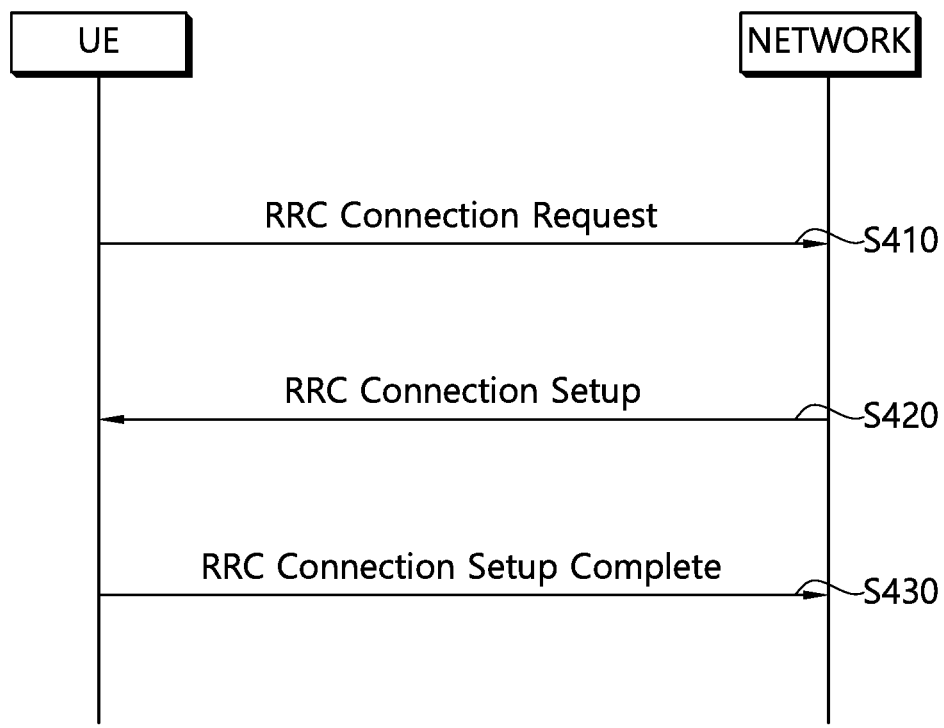
FIG. 4 shows an RRC connection establishment procedure.

FIG. 4 shows an RRC connection establishment procedure.

UE sends an RRC connection request message that requests RRC connection to a network (S410). The network sends an RRC connection establishment message as a response to the RRC connection request (S420). After receiving the RRC connection establishment message, the UE enters RRC connected mode.

The UE sends an RRC connection establishment complete message used to check the successful completion of the RRC connection to the network (S430).

Figure 5:
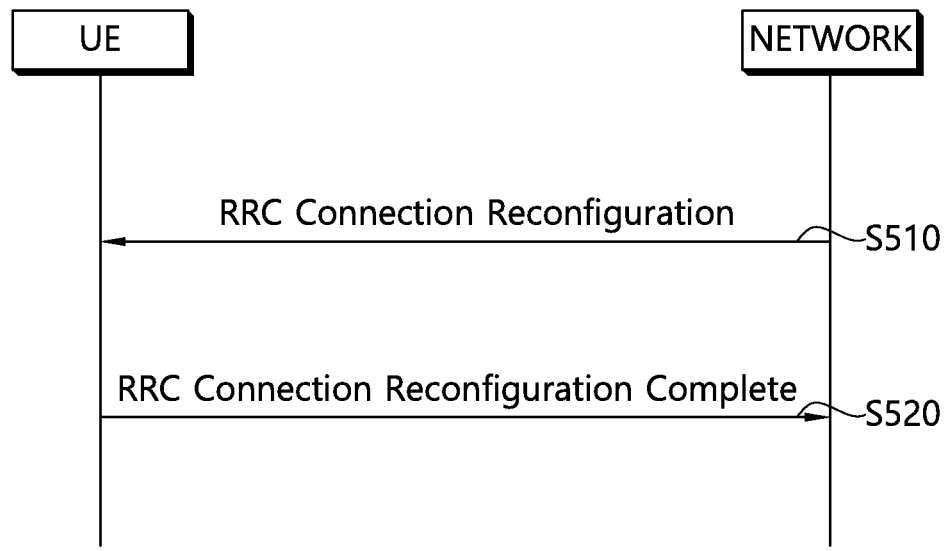
FIG. 5 shows an RRC connection reconfiguration procedure.

FIG. 5 shows an RRC connection reconfiguration procedure.

An RRC connection reconfiguration is used to modify RRC connection. This is used to establish/modify/release RBs, perform handover, and set up/modify/release measurements.

A network sends an RRC connection reconfiguration message for modifying RRC connection to UE (S510). As a response to the RRC connection reconfiguration message, the UE sends an RRC connection reconfiguration complete message used to check the successful completion of the RRC connection reconfiguration to the network (S520).

Figure 6:
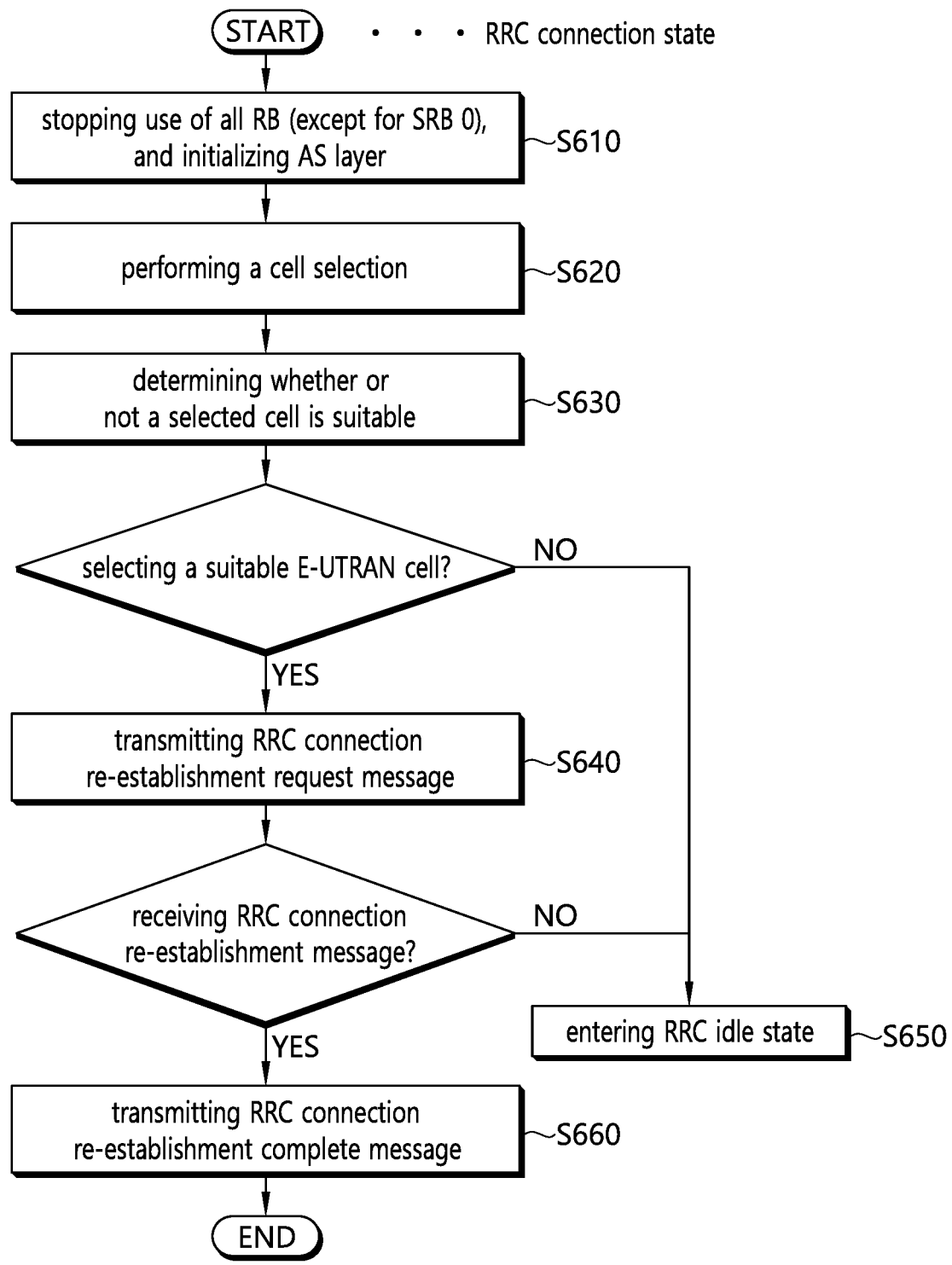
FIG. 6 shows an RRC connection re-establishment procedure.

FIG. 6 shows an RRC connection re-establishment procedure.

Referring to FIG. 6, UE stops using all the radio bearers that have been configured other than a Signaling Radio Bearer (SRB) #0, and initializes a variety of kinds of sublayers of an Access Stratum (AS) (S610). Furthermore, the UE configures each sublayer and the PHY layer as a default configuration. In this process, the UE maintains the RRC connection state.

The UE performs a cell selection procedure of performing an RRC connection reconfiguration procedure (S620). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S630). If the selected cell is determined to be a suitable E-UTRAN cell, the UE sends an RRC connection re-establishment request message to the corresponding cell (S640).

Meanwhile, if the selected cell is determined to be a cell that uses RAT different from that of the E-UTRAN through the cell selection procedure of performing the RRC connection re-establishment procedure, the UE stops the RRC connection re-establishment procedure and enters the RRC idle state (S650).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S660).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Figure 7:
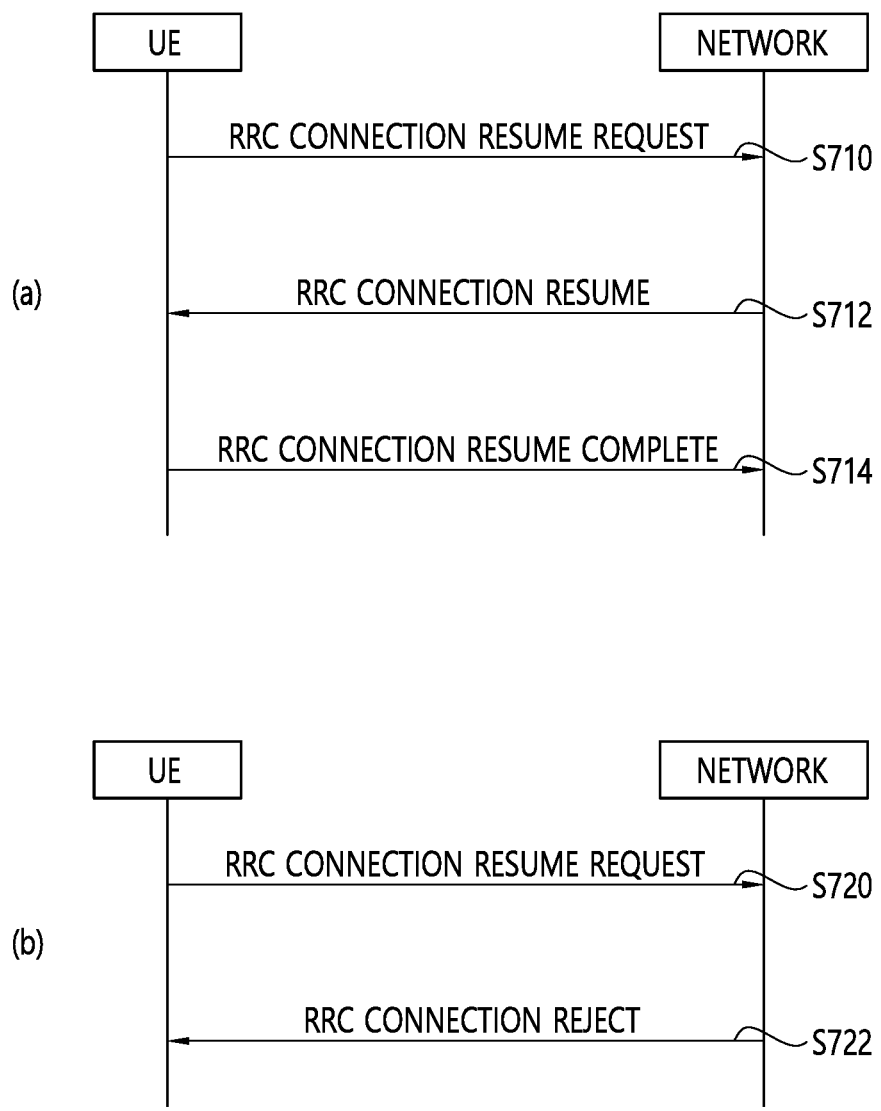
FIG. 7 shows an RRC connection resume procedure.

FIG. 7 shows an RRC connection resume procedure. FIG. 7A shows successful RRC connection resumption, and FIG. 7B shows network reject or released RRC connection resumption.

Referring to FIG. 7A, the UE (i.e., UE AS layer) transmits an RRC connection resume request message to a network to request the suspended RRC connection resumption (S710). When a first NAS message occurs, a UE NAS layer pending an original NAS message, and transmits only an RRC establishment cause and a call type to the UE AS layer (i.e., lower layer). As such, when the RRC establishment cause and the call type are transmitted from the NAS layer, the UE AS layer transmits an RRC connection resume request message to the network.

The UE (i.e., UE AS layer) receives an RRC connection resume message for resuming the suspended RRC connection from the network in response to the RRC connection resume request message (S712).

Upon receiving the RRC connection resume message, the UE enters the RRC_CONNECTED state. In addition, upon receiving the RRC connection resume message, the UE AS layer instructs a higher layer (i.e., NAS layer) that the suspended RRC connection is resumed.

The UE (i.e., UE AS layer) transmits an RRC connection resume complete message to the network in order to confirm the successful completion of RRC connection resumption (S714).

Referring to FIG. 7B, the UE (i.e., UE AS layer) transmits an RRC connection resume request message to a network to request the suspended RRC connection resumption (S720).

The UE (i.e., UE AS layer) receives an RRC connection reject message for rejecting the RRC connection establishment from the network in response to the RRC connection resume request message (S722).

Upon receiving the RRC connection resume message, the UE AS layer notifies the higher layer (i.e., NAS layer) that the RRC connection resumption fails.

Figure 8:
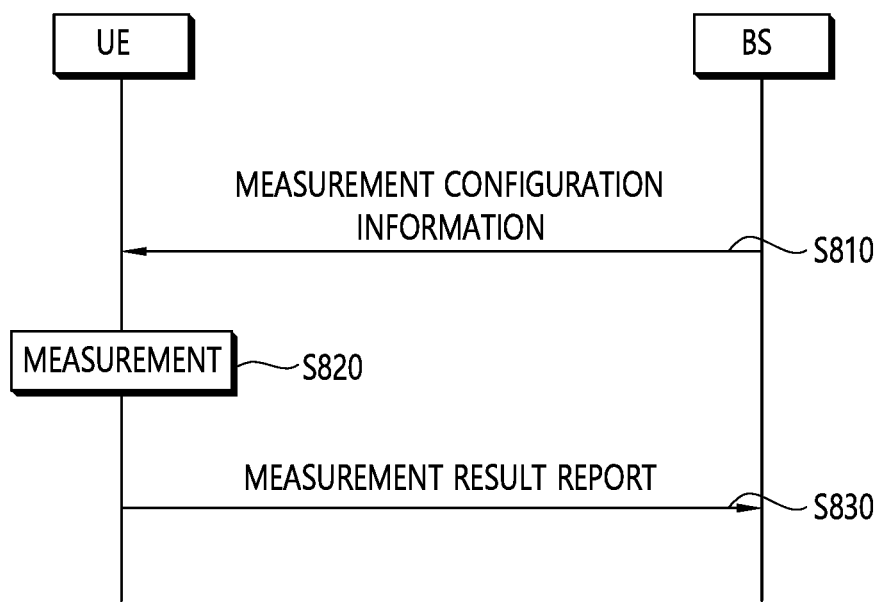
FIG. 8 shows a conventional method of performing measurement.

FIG. 8 shows a conventional method of performing measurement.

A UE receives measurement configuration information from a BS (S810). A message including the measurement configuration information is referred to as a measurement configuration message. The UE performs measurement based on the measurement configuration information (S820). If a measurement result satisfies a reporting condition included in the measurement configuration information, the UE reports the measurement result to the BS (S830). A message including the measurement result is referred to as a measurement report message.

The measurement configuration information may include the following information.

(1) Measurement object: The object is on which the UE performs the measurements. The measurement object includes at least one of an intra-frequency measurement object which is an object of intra-frequency measurement, an inter-frequency measurement object which is an object of inter-frequency measurement, and an inter-RAT measurement object which is an object of inter-RAT measurement. For example, the intra-frequency measurement object may indicate a neighboring cell having the same frequency as a frequency of a serving cell, the inter-frequency measurement object may indicate a neighboring cell having a different frequency from a frequency of the serving cell, and the inter-RAT measurement object may indicate a neighboring cell of a different RAT from an RAT of the serving cell.

(2) Reporting configuration: This includes a reporting criterion and a reporting format. The reporting criterion is used to trigger the UE to send a measurement report and can either be periodical or a single event description. The reporting format is a quantity that the UE includes in measurement reporting and associated information (e.g. number of cells to report).

(3) Measurement identify: Each measurement identity links one measurement object with one reporting configuration. By configuring multiple measurement identities, it is possible to link more than one measurement object to the same reporting configuration, as well as to link more than one reporting configuration to the same measurement object. The measurement identity is used as a reference number in measurement reporting. The measurement identify may be included in measurement reporting to indicate a specific measurement object for which the measurement result is obtained and a specific reporting condition according to which measurement reporting is triggered.

(4) Quantity configuration: One quantity configuration is configured per RAT type. The quantity configuration defines the measurement quantities and associated filtering used for all event evaluation and related reporting of that measurement type. One filter can be configured per measurement quantity.

(5) Measurement gaps: Measurement gaps are periods that the UE may use to perform measurements when downlink transmission and uplink transmission are not scheduled.

To perform a measurement procedure, the UE has a measurement object, a reporting configuration, and a measurement identity.

In 3GPP LTE, the BS can assign only one measurement object to the UE with respect to one frequency. Events for triggering measurement reporting are shown in the table 1. If the measurement result of the UE satisfies the determined event, the UE transmits a measurement report message to the BS.

TABLE 1

| Event | Reporting Condition |
|---|---|
| Event A1 | Serving becomes better than threshold |
| Event A2 | Serving becomes worse than threshold |
| Event A3 | Neighbour becomes offset better than PCell/PSCell |
| Event A4 | Neighbour becomes better than threshold |
| Event A5 | PCell/PSCell becomes worse than threshold1 and neighbour becomes better than threshold2 |
| Event A6 | Neighbour becomes offset better than SCell |
| Event B1 | Inter RAT neighbour becomes better than threshold |
| Event B2 | PCell becomes worse than threshold1 and inter RAT neighbour becomes better than threshold2 |
| Event C1 | CSI-RS resource becomes better than threshold |
| Event C2 | CSI-RS resource becomes offset better than reference CSI-RS resource |
| Event W1 | WLAN becomes better than a threshold |
| Event W2 | All WLAN inside WLAN mobility set becomes worse than threshold1 and a WLAN outside WLAN mobility set becomes better than threshold2 |
| Event W3 | All WLAN inside WLAN mobility set becomes worse than a threshold |

The measurement report may include the measurement identity, a measured quality of the serving cell, and a measurement result of the neighboring cell. The measurement identity identifies a measurement object in which the measurement report is triggered. The measurement result of the neighboring cell may include a cell identity and a measurement quality of the neighboring cell. The measured quality may include at least one of reference signal received power (RSRP) and reference signal received quality (RSRQ).

For detailed content about the measurement report triggering event of Table 1, refer to 5.5.4 of 3GPP TS 36.331 V14.1.0 (2016 December).

Meanwhile, the UE may perform the RRC connection re-establishment procedure. For example, the RRC connection re-establishment procedure may be performed after the UE declares a radio link failure (RLF), when a handover fails, or when an RRC connection reconfiguration failure occurs. In the RRC connection re-establishment procedure, the UE needs to wait for a first RRC connection reconfiguration message to resume all suspended DRBs. This may cause unnecessary latency and high possibility of data loss. This is because the UE cannot resume all the suspended DRBs as soon as the RRC connection re-establishment is completed. Therefore, an enhanced RRC connection re-establishment procedure needs to be proposed.

Meanwhile, the measurement report and the handover procedure may not be supported for some UEs. For example, some UEs may be an NB-IoT UE. Since the NB-IoT does not support the CONNECTED mobility mode, the NB-IoT UE in the RRC_CONNECTED state may not move to a neighboring cell having good quality even if quality of a serving cell is poor. Accordingly, to provide better service, UE based mobility needs to be supported for the some UEs.

Hereinafter, according to the embodiment of the present disclosure, a method of a terminal re-establishing or resuming an RRC connection and an apparatus for supporting the same will be described in detail.

Figure 9:
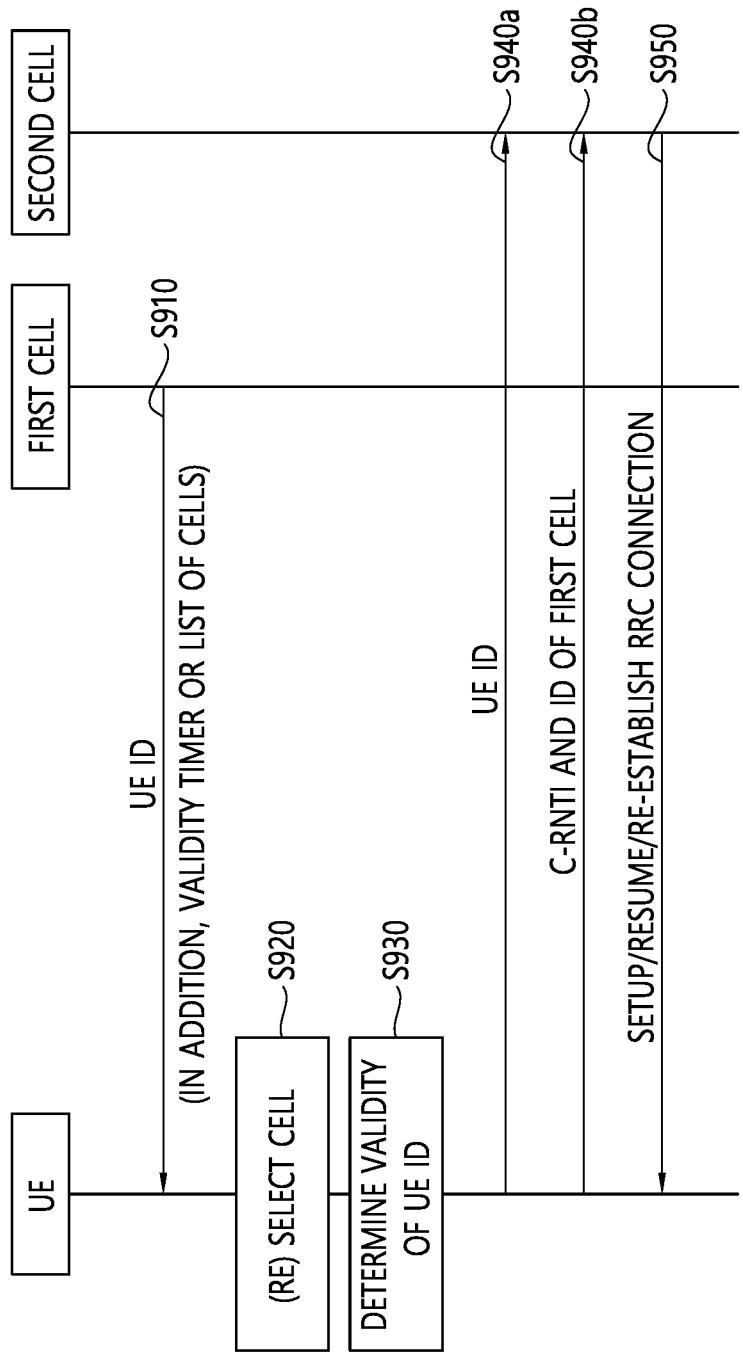
FIG. 9 shows a procedure of creating, by a user equipment (UE), an RRC connection based on a UE ID according to an embodiment of the present disclosure.

FIG. 9 shows a procedure of a terminal creating an RRC connection based on a UE ID according to an embodiment of the present disclosure.

Referring to FIG. 9, in step S910, the UE may receive a UE ID from a first cell. The UE may be in an RRC_CONNECTED state. The first cell may be a cell managed by an eNB. Alternatively, the first cell may be a cell managed by a gNB. The UE ID may be an ID applied to the re-establishment of the RRC connection. The UE ID may correspond to a resume ID. The UE ID is received through an RRC connection setup message, an RRC connection resume message, an RRC connection release message, or an RRC connection reconfiguration message.

In addition, the UE may receive an area in which the UE ID is valid. For example, the UE may receive a list of cells. In addition, the UE may receive a validity timer.

In step S920, the UE may perform cell selection or reselection. As a result, a second cell may be selected or reselected by the UE. The second cell may be the same cell as the first cell. Alternatively, the second cell may be a different cell from the first cell. For example, the first cell may be a serving cell, and the second cell may be a neighboring cell. When the UE initiates the re-establishment procedure, the cell selection or reselection may be performed. The UE may suspend all established SRBs except for SRB0 and all established DRBs.

In step S930, the UE may determine the validity of the received UE ID. If the second cell corresponds to an area in which the UE ID is valid, the UE may consider the UE ID to be valid in the second cell. For example, if the second cell is included in the list of cells, the UE may consider that the UE ID is valid in the second cell. If the validity timer is operating, the UE may consider the UE ID to be valid. When the UE receives both the list of cells and the validity timer, the second cell is included in the list of cells and when the validity timer has not expired, the UE may consider the UE ID to be valid in the second cell.

If the UE has a valid UE ID in the selected second cell, in step S940a, the UE may transmit the UE ID to the second cell. The UE ID may be included in the RRC connection resume request message and transmitted to the second cell. Alternatively, even if the second cell is not included in the list of cells, if system information of the selected second cell indicates support of the RRC connection resume for re-establishment, the second cell may be considered to be a cell in which the UE ID is valid.

Otherwise, if the UE does not have a valid UE ID in the selected second cell, in step S940b, the UE may transmit C-RNTI and an ID of the first cell to the second cell. That is, the UE ID may be ignored. The C-RNTI and the ID of the first cell may be included in an RRC connection re-establishment request message and transmitted to the second cell.

In step S950, the UE may receive at least one of the RRC connection setup message, the RRC connection resume message, or the RRC connection re-establishment message.

If the UE receives the RRC connection setup message, the UE may notify the NAS layer of the failure. The UE may transmit the RRC connection setup complete message to transmit an initial UE NAS message.

If the UE receives the RRC connection resume message, the UE may resume all suspended SRBs and all suspended DRBs. The UE may transmit an RRC connection resume complete message.

If the UE receives the RRC connection re-establishment message, the UE may resume all the suspended SRBs only. That is, the suspended DRB may not be resumed. The UE may transmit the RRC connection resume complete message.

Figure 10:
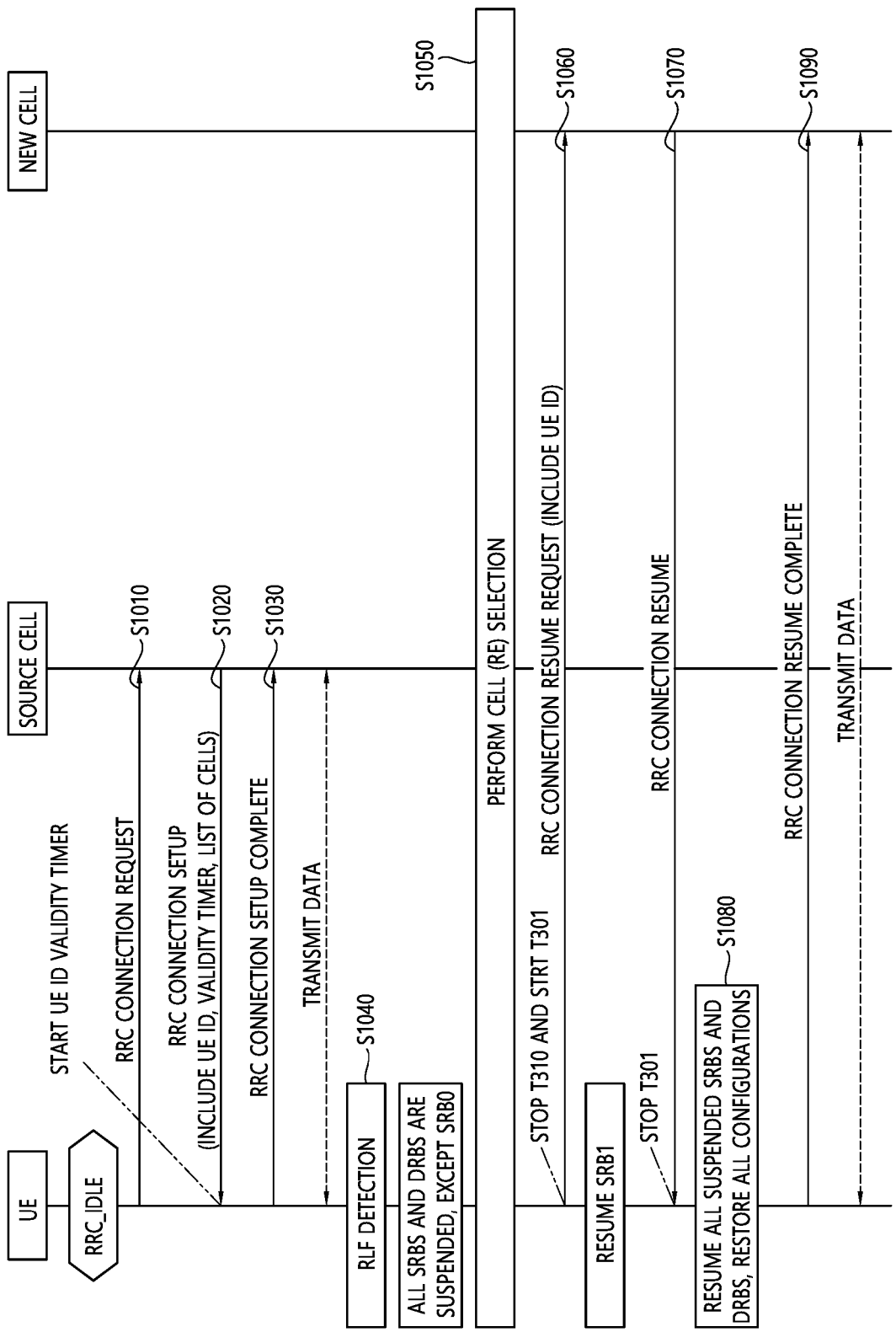
FIG. 10 shows a procedure of a terminal resuming an RRC connection based on a UE ID according to an embodiment of the present disclosure.

FIG. 10 shows a procedure of a terminal resuming an RRC connection based on a UE ID according to an embodiment of the present disclosure.

In step S1010, the UE may attempt to establish the RRC connection. The UE may transmit the RRC connection request message to a source cell.

In step S1020, the source cell may transmit the RRC connection setup message to the UE. The RRC connection setup message may be transmitted when the source cell can approve the RRC connection request of the UE. The RRC connection setup message may include a UE ID. For example, the UE ID included in the RRC connection setup message may be a resume ID. In addition, the RRC connection setup message may include the validity timer for the UE ID. The UE ID may be valid while the validity timer is operating. In addition, the RRC connection setup message may include a list of cells. The UE ID may be valid within a cell included in the list of cells. Upon receiving the RRC connection setup message, the UE can store the UE ID and start the validity timer.

In step S1030, the UE may receive an RRC connection setup complete message.

In step S1040, the UE may initiate an RRC connection re-establishment procedure. If a radio link failure (RLF), a handover failure, a reconfiguration failure, or a security check failure occurs, the RRC connection re-establishment procedure may be initiated. In the RRC connection re-establishment procedure, the UE may suspend all SRBs except SRB0 and suspend all DRBs. In addition, the UE may store current radio bearer configurations.

In step S1050, in the RRC connection re-establishment procedure, the UE may perform cell selection or cell reselection. The UE may select or reselect a cell. For example, the cell selection or the cell reselection may be performed on a cell included in the list of cells. For example, the selected cell may be a neighboring cell. For example, the selected cell may be a source cell.

In step S1060, in the RRC connection re-establishment procedure, if the selected cell is listed in the list of cells, the UE may transmit an RRC connection resume request message including the UE ID to the selected cell. If the validity timer is still operating, the UE ID may be included in the RRC connection resume request message. Alternatively, in the RRC connection re-establishment procedure, if the system information of the selected cell indicates support of RRC connection resumption for re-establishment, the UE may transmit an RRC connection resume request message including the UE ID to the selected cell. Thereafter, the UE may resume SRB1.

In step S1070, the base station may determine that the DRB is resumed with the SRB. Accordingly, the base station may transmit the RRC connection resume message to the UE, the UE may receive the RRC connection resume message.

In step S1080, if the UE receives the RRC connection resume message from the selected cell, the UE may resume all the suspended DRBs, and may restore another radio bearer configuration.

In step S1090, the UE may receive an RRC connection resume complete message. If the UE succeeds in the RRC connection re-establishment including the resumption of all DRBs, the RRC connection resume completion message may be transmitted to the selected cell.

Alternatively, although not shown in FIG. 10, in the RRC connection re-establishment procedure, if the selected cell is not listed in the list of cells, in step S1060, the UE may transmit an RRC connection re-establishment request message including the C-RNTI and the ID of the source cell to the selected cell. The UE ID is not included in the RRC connection re-establishment request message. Alternatively, in the RRC connection re-establishment procedure, if the system information of the selected cell indicates the support of the RRC connection resumption for the re-establishment, in step S1060, the UE may transmit the RRC connection re-establishment request message including C-RNTI and an ID of a source cell to the selected cell. Thereafter, the UE may resume SRB1.

The base station may determine that the DRB is not resumed with the SRB. Accordingly, the base station may transmit the RRC connection re-establishment message to the UE, the UE may receive the RRC connection re-establishment message. When the UE receives the RRC connection re-establishment message from the selected cell, the UE may resume the SRB1 if necessary, and may re-establish a radio bearer configuration. If the UE succeeds in the RRC connection re-establishment, the UE may transmit an RRC connection re-establishment complete message to the selected cell.

Alternatively, the base station may not fetch a context of the UE. Accordingly, the base station may transmit the RRC connection setup message to the UE, the UE may receive the RRC connection setup message. When the UE receives the RRC connection setup message from the selected cell, the UE may delete the UE ID, all suspended RBs, and stored radio bearer setup. The UE may notify the UE NAS layer of this failure. If the UE succeeds in the RRC connection setup, the UE may transmit the RRC connection setup complete message to the selected cell. The RRC layer of the UE may include a NAS message in the RRC connection setup complete message.

According to the prior art, the suspended DRB cannot be resumed while performing RRC connection re-establishment. Therefore, after performing the RRC connection re-establishment procedure, in order to resume the suspended DRB, the UE needs to wait until receiving the RRC connection re-establishment message from the network. On the other hand, according to one embodiment of the present disclosure, while performing the RRC connection re-establishment, all the suspended DRBs may be resumed. Accordingly, the UE may perform good DRB handling.

Hereinafter, a method for a terminal re-establishing an RRC connection based on a measurement report triggering condition according to an embodiment of the present disclosure will be described.

(1) Step 1: When the UE receives the event triggering condition from the network, the UE served by the first cell may evaluate whether the event triggering condition is satisfied for the second cell. The UE may be in an RRC_CONNECTED state. The UE may be in an NB-IoT UE. The event triggering condition may be received through a measurement configuration signaled by the base station. The event and corresponding reporting conditions may be defined as shown in Table 1 above.

(2) Step 2: If the event triggering condition is satisfied for the second cell, the UE may declare a radio link failure on the first cell or move to a suspended status on the first cell.

(3) Step 3: If the radio link failure is declared, the UE may select or reselect a cell and access the cell. The cell may be the second cell. If the UE remains in the suspended status, the UE may select or reselect a cell and access the cell for resumption. The cell may be the second cell.

To access the cell, the UE ID allocated by the network may be used. The method of determining the validity of the allocated UE ID and the procedure of resuming the RRC connection based on the same have been described in detail with reference to FIGS. 9 and 10, and thus detailed description thereof will be omitted.

Hereinafter, a method for a terminal re-establishing an RRC connection based on event A2 and event A3 according to an embodiment of the present disclosure will be described.

In case of the NB-IoT UE in the RRC_CONNECTED state, the RLF may trigger mobility performed by the RRC connection re-establishment procedure. When the NB-IoT UE is in the RRC_CONNECTED state, in order to support UE based mobility, the network may set measurement settings for the event A2 and the event A3 in the UE. The measurement setting may be set through an RRC signal message. For example, the RRC signal message may be any one of the RRC connection Request message, the RRC connection resume message, or the RRC connection reconfiguration message.

When configuring the measurements for the event A2 and the event A3, the NB-IoT UE may use an s-Measure value that means a source cell quality threshold value. The s-Measure value may be used regardless of whether the UE is required to perform inter-frequency measurement or intra-frequency measurement. If the source cell quality is worse than the s-Measure value, the NB-IoT UE may start to measure the event A2 configuration and the event A3 configuration.

If the entry condition of the event A2 and the event A3 is satisfied, the RRC of the UE may perform a radio link failure (RLF) detection procedure to move toward the target cell. In this case, even if any radio link problem is not indicated by a lower layer, the RRC of the UE may regard the current state as the RLF. If the RLF is detected, the UE should leave the RRC_CONNECTED due to a new release cause for UE based mobility. The UE may initiate the RRC connection re-establishment procedure to move to the target cell.

Alternatively, if the entry condition of the event A2 and the event A3 is satisfied, the RRC of the UE may remain in a suspended status. In this case, the UE should leave RRC_CONNECTED due to a new release cause for the UE based mobility. The UE may initiate the RRC connection resume procedure to move to the target cell.

Figure 11:
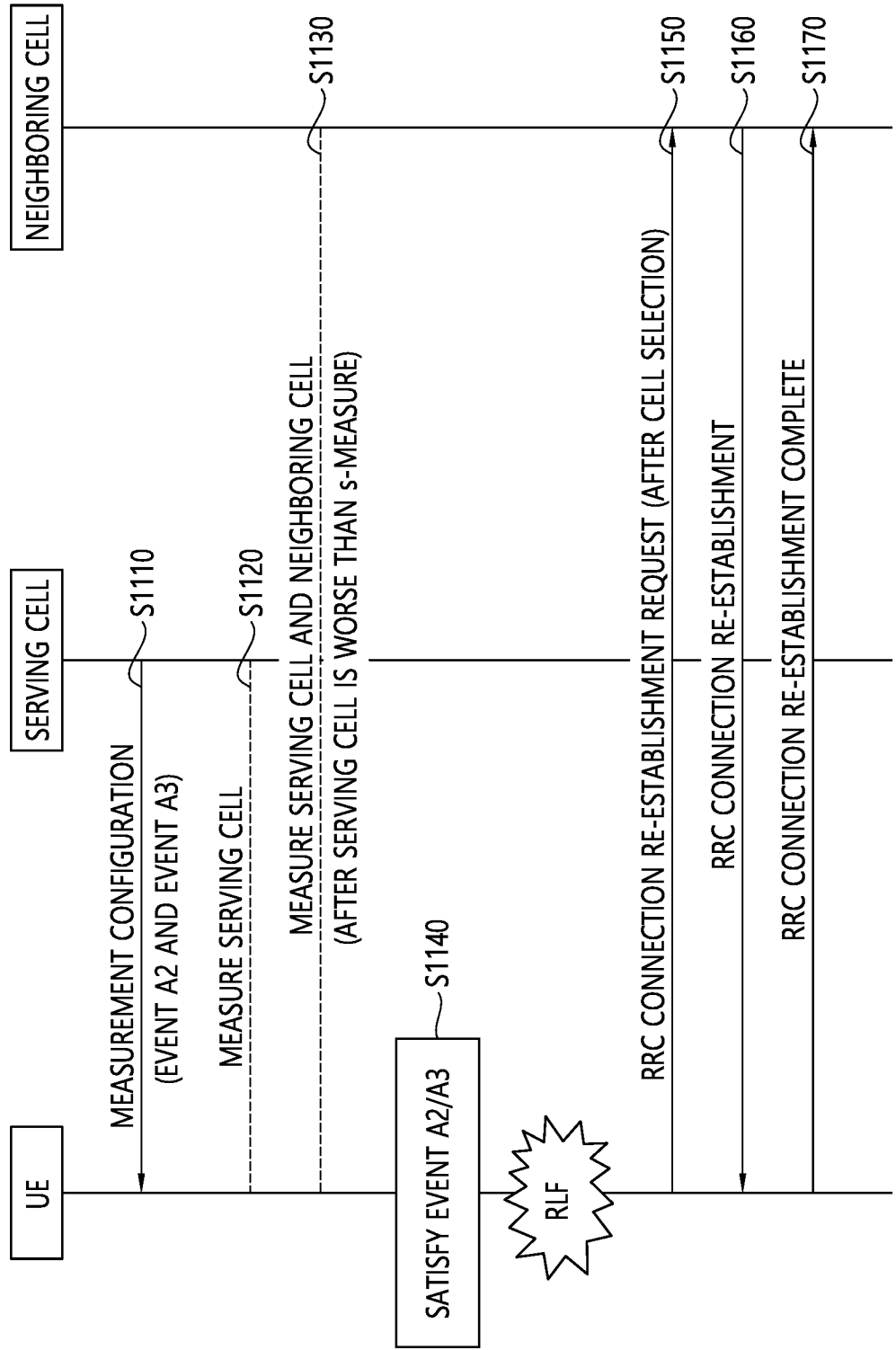
FIG. 11 shows a procedure of a terminal re-establishing an RRC connection based on a measurement report triggering condition according to an embodiment of the present disclosure.

FIG. 11 shows a procedure of a terminal re-establishing an RRC connection based on a measurement report triggering condition according to an embodiment of the present disclosure.

Referring to FIG. 11, in step S1110, upon receiving the measurement configuration through system information or dedicated signaling, the UE may configure measurement configuration event A2 and measurement configuration event A3. The measurement settings for the event A2 and the event A3 may be provided by the RRC signal message. For example, the UE may configure measConfig IE in the RRC connection request message. As an example, the UE may configure measConfig IE in the RRC connection request message. As another example, the UE may configure the measConfig IE in the RRC connection reconfiguration message. The measConfig IE may include reportConfigEUTRA and measObjectEUTRA for event A2, event A3, and s-Measure.

In step S1120, the UE may measure only source cell quality with the s-Measure.

In step S1130, when the source cell quality is worse than the s-Measure value, the UE may perform intra frequency measurement or inter frequency measurement.

In step S1140, when the source cell quality is worse than the given threshold value, the UE may consider that the entering condition of the event A2 is satisfied. When the neighboring cell quality is better than the source cell quality, the UE may consider that the entering condition of the event A3 is satisfied. If the subscription condition of the event A2 and the event A3 is satisfied for the neighboring cell, the UE may declare the radio link failure or move to the suspended status in the source cell. In the embodiment of FIG. 11, it is assumed that the UE declares the radio link failure.

If the radio link failure is declared, the UE may initiate the RRC connection re-establishment procedure. In the RRC connection re-establishment procedure, the UE may perform cell selection or cell reselection and may select or reselect a cell. The UE may directly select a neighboring cell.

In step S1150, the UE may transmit the RRC connection re-establishment request message to the selected cell. The RRC connection re-establishment request message may include the C-RNTI and the ID of the serving cell. In step S1040, the UE may initiate an RRC connection re-establishment procedure. In step S1170, the UE may transmit the RRC connection re-establishment complete message to the selected cell.

Figure 12:
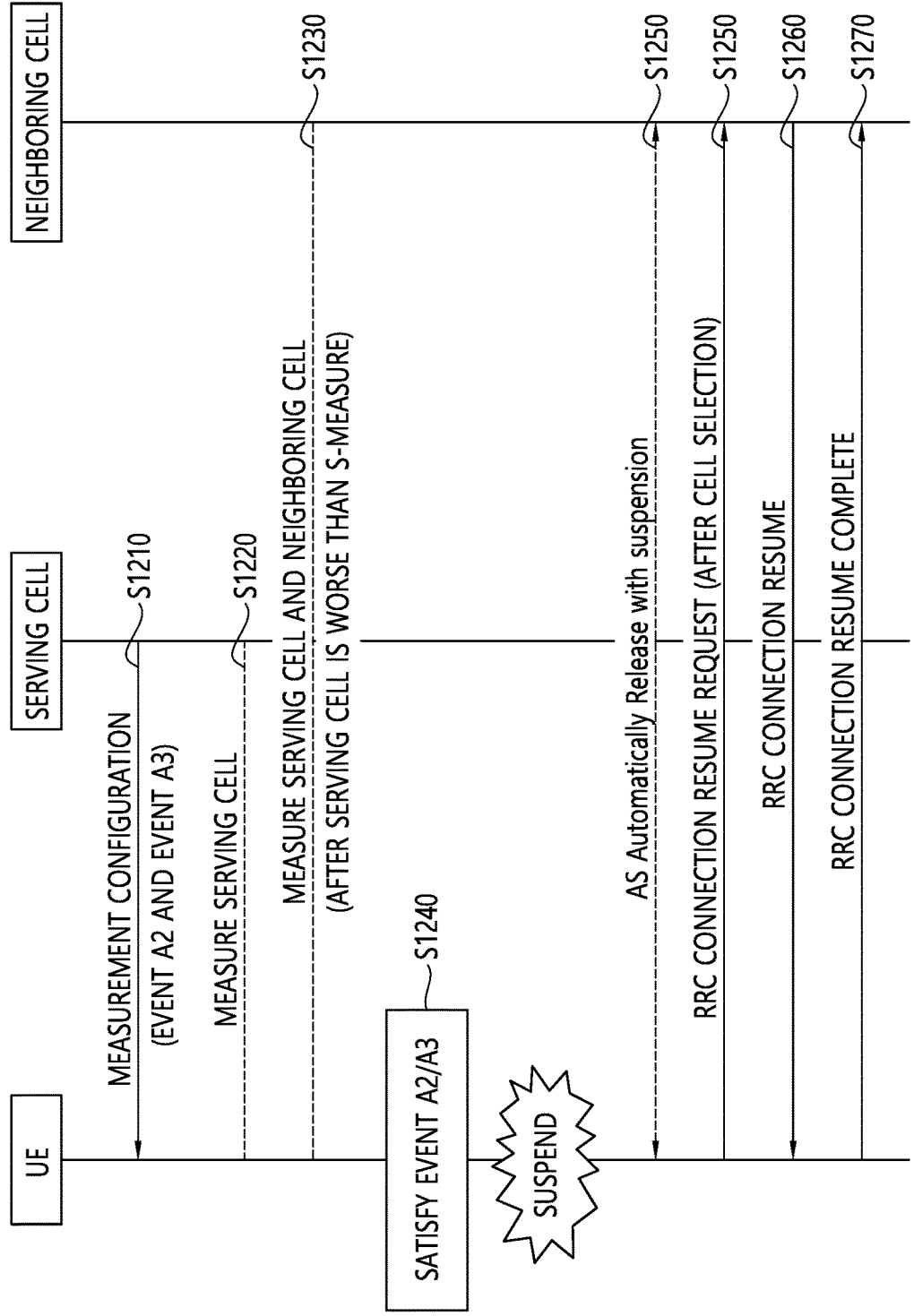
FIG. 12 shows a procedure of a terminal resuming an RRC connection based on a measurement report triggering condition according to an embodiment of the present disclosure.

FIG. 12 shows a procedure of a terminal resuming an RRC connection based on a measurement report triggering condition according to an embodiment of the present disclosure.

Referring to FIG. 12, in step S1210, upon receiving the measurement configuration through system information or dedicated signaling, the UE may configure measurement configuration event A2 and measurement configuration event A3. The measurement settings for the event A2 and the event A3 may be provided by the RRC signal message. For example, the UE may configure measConfig IE in the RRC connection request message. As an example, the UE may configure measConfig IE in the RRC connection request message. As another example, the UE may configure the measConfig IE in the RRC connection reconfiguration message. The measConfig IE may include reportConfigEUTRA and measObjectEUTRA for event A2, event A3, and s-Measure.

In step S1220, the UE may measure only source cell quality with the s-Measure.

In step S1230, when the source cell quality is worse than the s-Measure value, the UE may perform intra frequency measurement or inter frequency measurement.

In step S1240, when the source cell quality is worse than the given threshold value, the UE may consider that the entering condition of the event A2 is satisfied. When the neighboring cell quality is better than the source cell quality, the UE may consider that the entering condition of the event A3 is satisfied. If the subscription condition of the event A2 and the event A3 is satisfied for the neighboring cell, the UE may declare the radio link failure or move to the suspended status in the source cell. In the embodiment of FIG. 12, it is assumed that the UE moves to the suspended status.

When the UE moves to the suspended status, the UE may initiate the RRC connection resume procedure. To move to the RRC connection resumption, the UE may perform cell selection or cell reselection and may select or reselect a cell. The UE may directly select a neighboring cell.

In step S1250, the UE may transmit the RRC connection resume request message to the selected cell. In step S1260, the UE may receive the RRC connection resume request message. If the UE receives the RRC connection resume message, the UE may resume all suspended SRBs and all suspended DRBs. In step S1270, the UE may transmit the RRC connection resume complete message to the selected cell.

Figure 13:
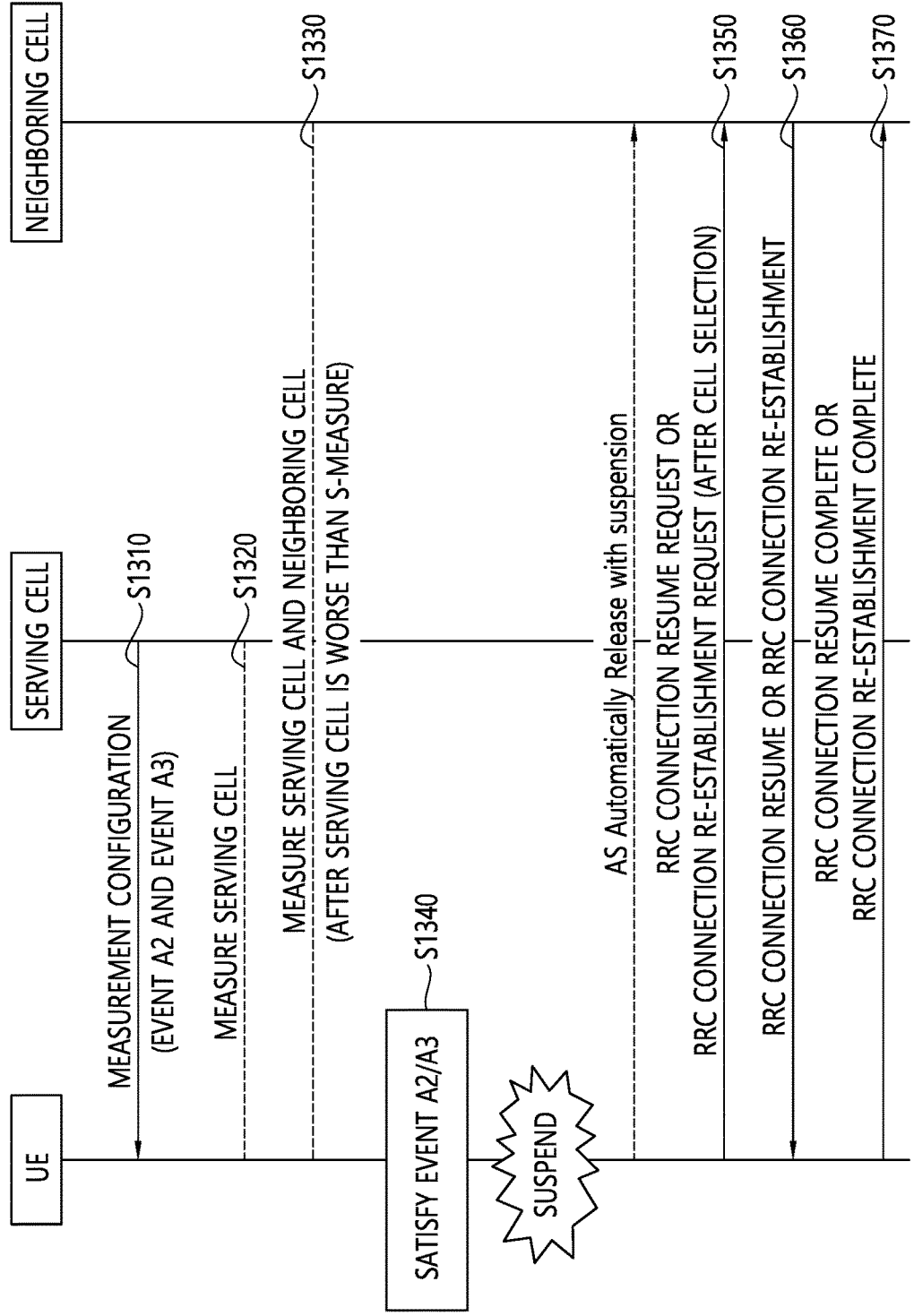
FIG. 13 shows a procedure of a terminal resuming or re-establishing an RRC connection based on a measurement report triggering condition and a UE ID according to an embodiment of the present disclosure.

FIG. 13 shows a procedure of a terminal resuming or re-establishing an RRC connection based on a measurement report triggering condition and a UE ID according to an embodiment of the present disclosure.

Referring to FIG. 13, in step S1310, upon receiving the measurement configuration through system information or dedicated signaling, the UE may configure measurement configuration event A2 and measurement configuration event A3. The measurement settings for the event A2 and the event A3 may be provided by the RRC signal message. For example, the UE may configure measConfig IE in the RRC connection request message. As an example, the UE may configure measConfig IE in the RRC connection request message. As another example, the UE may configure the measConfig IE in the RRC connection reconfiguration message. The measConfig IE may include reportConfigEUTRA and measObjectEUTRA for event A2, event A3, and s-Measure.

In addition, the UE may receive the UE ID from the serving cell. In addition, the UE may receive an area in which the UE ID is valid. For example, the UE may receive a list of cells. In addition, the UE may receive a validity timer.

In step S1320, the UE may measure only source cell quality with the s-Measure.

In step S1330, when the source cell quality is worse than the s-Measure value, the UE may perform intra frequency measurement or inter frequency measurement.

In step S1340, when the source cell quality is worse than the given threshold value, the UE may consider that the entering condition of the event A2 is satisfied. When the neighboring cell quality is better than the source cell quality, the UE may consider that the entering condition of the event A3 is satisfied. If the subscription condition of the event A2 and the event A3 is satisfied for the neighboring cell, the UE may declare the radio link failure or move to the suspended status in the source cell.

In addition, the UE may perform cell selection or cell reselection and may select or reselect a cell. The UE may directly select a neighboring cell.

In addition, the UE may determine the validity of the received UE ID. If the selected cell corresponds to an area in which the UE ID is valid, the UE may consider the UE ID to be valid in the selected cell. For example, if the selected cell is included in the list of cells, the UE may consider that the UE ID is valid in the selected cell. If the validity timer is operating, the UE may consider the UE ID to be valid. When the UE receives both the list of cells and the validity timer, the selected cell is included in the list of cells and when the validity timer has not expired, the UE may consider the UE ID to be valid in the selected cell.

If the UE has a valid UE ID in the selected cell, in step S1350, the UE may transmit the UE ID to the selected cell. The UE ID may be included in the RRC connection resume request message and transmitted to the selected cell. In step S1360, the UE may receive the RRC connection resume request message. If the UE receives the RRC connection resume message, the UE may resume all suspended SRBs and all suspended DRBs. In step S1370, the UE may transmit the RRC connection resume complete message to the selected cell.

Otherwise, if the UE does not have a valid UE ID in the selected cell, in step S1350, the UE may transmit an RRC connection re-establishment request message to the selected cell. The RRC connection re-establishment request message may include the C-RNTI and the ID of the serving cell. In step S1360, the UE may initiate an RRC connection re-establishment procedure. If the UE receives the RRC connection re-establishment message, the UE may resume all the suspended SRBs only. That is, the suspended DRB may not be resumed. In step S1370, the UE may transmit the RRC connection re-establishment complete message to the selected cell.

14 is a block diagram illustrating a method for requesting an RRC connection according to an embodiment of the present disclosure.

Figure 14:
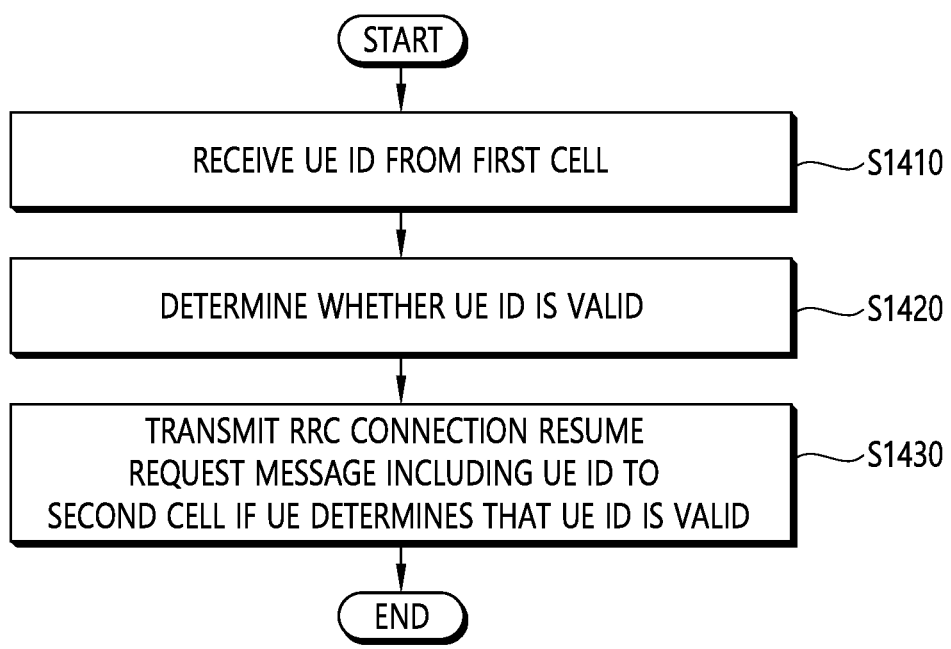
FIG. 14 is a block diagram illustrating a method for requesting an RRC connection according to an embodiment of the present disclosure.

Referring to FIG. 14, in step S1410, the UE may receive a UE ID from a first cell. The UE ID may be a resume ID used to resume the RRC connection.

In step S1420, the UE may determine whether the UE ID is valid.

In addition, the UE may select the second cell. After a radio link failure (RLF), a handover failure, a reconfiguration failure, or a security check failure occurs, the second cell may be selected by the UE. The second cell may be the same cell as or a different cell from the first cell. The first cell may be a source cell of the UE, and the second cell may be a cell selected or a cell re-selected by the UE.

In addition, the UE may receive a list of cells. It may be determined whether the UE ID is valid based on the list of cells. If the selected second cell is included in the list of cells, the UE may determine that the UE ID is valid.

In addition, the UE may receive the validity timer for the UE ID. It may be determined whether the UE ID is valid based on the validity timer. In addition, the UE may initiate the validity timer. If the validity timer does not expire, the UE may determine that the UE ID is valid. If the UE ID is received from the first cell, the validity timer may be initiated.

In step S1430, if the UE determines that the UE ID is valid, the UE may transmit the RRC connection resume request message including the UE ID to the second cell. In addition, after transmitting the RRC connection resume request message, the UE may resume all suspended signaling radio bearers (SRBs) and all suspended data radio bearers (DRBs).

In addition, if the UE determines that the UE ID is not valid, the UE may transmit an RRC connection re-establishment request message including the cell radio network temporary identifier (C-RNTI) and the ID of the first cell to the second cell. In addition, after transmitting the RRC connection re-establishment request message, the UE may resume only all suspended signaling radio bearers (SRBs).

Figure 15:
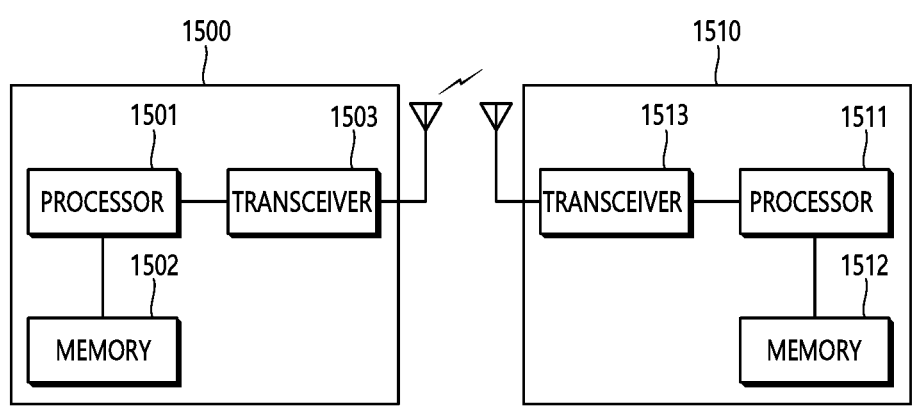
FIG. 15 is a block diagram illustrating a wireless communication system according to the embodiment of the present disclosure.

FIG. 15 is a block diagram illustrating a wireless communication system according to the embodiment of the present disclosure.

A BS 1500 includes a processor 1501, a memory 1502 and a transceiver 1503. The memory 1502 is connected to the processor 1501, and stores various information for driving the processor 1501. The transceiver 1503 is connected to the processor 1501, and transmits and/or receives radio signals. The processor 1501 implements proposed functions, processes and/or methods. In the above embodiment, an operation of the base station may be implemented by the processor 1501.

A UE 1510 includes a processor 1511, a memory 1512 and a transceiver 1513. The memory 1512 is connected to the processor 1511, and stores various information for driving the processor 1511. The transceiver 1513 is connected to the processor 1511, and transmits and/or receives radio signals. The processor 1511 implements proposed functions, processes and/or methods. In the above embodiment, an operation of the base station may be implemented by the processor 1511.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the disclosure disclosed in the claims is not limited to the order of the steps or blocks, and each step or block can be implemented in a different order, or can be performed simultaneously with other steps or blocks. In addition, those ordinarily skilled in the art can know that the disclosure is not limited to each of the steps or blocks, and at least one different step can be added or deleted without departing from the scope and spirit of the disclosure.

The aforementioned embodiment includes various examples. It should be noted that those ordinarily skilled in the art know that all possible combinations of examples cannot be explained, and also know that various combinations can be derived from the technique of the present specification. Therefore, the protection scope of the disclosure should be determined by combining various examples described in the detailed explanation, without departing from the scope of the following claims.

What is claimed is:

1. A method for a radio resource control (RRC) connection by a user equipment (UE) in a wireless communication system, the method comprising:
    receiving, from a first cell, a resume ID for resumption of the RRC connection and a list of cells in which the resume ID is valid;
    selecting a second cell;
    receiving, from the second cell, system information including information representing whether or not the second cell supports an RRC connection resume for re-establishment;
    determining whether or not the resume ID is valid for the second cell, based on the list of cells and the information included in the system information,
    wherein, based on (i) the second cell not being included in the list of cells and (ii) the information representing that the second cell supports the RRC connection resume for re-establishment, the UE determines that the resume ID is valid for the second cell; and
    based on whether or not the resume ID is valid for the second cell, transmitting an RRC connection resume request message or an RRC connection re-establishment request message to the second cell,
    wherein, based on determining that the resume ID is valid for the second cell, the RRC connection resume request message including the resume ID is transmitted to the second cell, and
    wherein, based on determining that the resume ID is not valid for the second cell, the RRC connection re-establishment request message including (i) a cell radio network temporary identifier (C-RNTI) of the second cell and (ii) an ID of the first cell is transmitted to the second cell.

2. The method of claim 1, wherein after a radio link failure (RLF), a handover failure, a reconfiguration failure, or a security check failure occurs, the second cell is selected by the UE.

3. The method of claim 1, wherein the UE communicates with at least one of a mobile terminal, a network or autonomous vehicles other than the UE.

4. The method of claim 1, wherein, based on (i) the second cell not being included in the list of cells and (ii) the information representing that the second cell does not support the RRC connection resume for re-establishment, the UE determines that the resume ID is not valid for the second cell.

5. The method of claim 1, wherein, based on the second cell being included in the list of cells, the UE determines that the resume ID is valid for the second cell.

6. The method of claim 1, further comprising:
    receiving a validity timer for the resume ID,
    wherein the UE determines whether the resume ID is valid for the second cell based on the validity timer.

7. The method of claim 6, further comprising:
    initiating the validity timer, wherein, based on the validity timer not expiring, the UE determines that the resume UE ID is valid for the second cell.

8. The method of claim 7, wherein, based on the resume ID being received from the first cell, the validity timer is initiated.

9. The method of claim 1, wherein the first cell is a source cell of the UE, and the second cell is a cell selected or a cell reselected by the UE.

10. The method of claim 1, further comprising:
resuming all suspended signaling radio bearers (SRBs) and all suspended data radio bearers (DRBs) after transmitting the RRC connection resume request message.

11. The method of claim 1, further comprising:
resuming only all suspended signaling radio bearers (SRBs) after transmitting the RRC connection re-establishment request message.

12. A UE configured for a radio resource control (RRC) connection in a wireless communication system, the UE comprising:
a memory;
a transceiver; and
a processor connecting between the memory and the transceiver,
wherein the processor is configured to
control the transceiver to receive, from a first cell, a resume ID for resumption of the RRC connection and a list of cells in which the resume ID is valid;
select a second cell;
control the transceiver to receive, from the second cell, system information including information representing whether or not the second cell supports an RRC connection resume for re-establishment;
determine whether or not the resume ID is valid for the second cell based on the list of cells and the information included in the system information,
wherein, based on (i) the second cell not being included in the list of cells and (ii) the information representing that the second cell supports the RRC connection resume for re-establishment, the UE determines that the resume ID is valid for the second cell; and
based on whether or not the resume ID is valid for the second cell, control the transceiver to transmit an RRC connection resume request message or an RRC connection re-establishment request message to the second cell,
wherein, based on determining that the resume ID is valid for the second cell, the RRC connection resume request message including the resume ID is transmitted to the second cell, and
wherein, based on determining that the resume ID is not valid for the second cell, the RRC connection re-establishment request message including (i) a cell radio network temporary identifier (C-RNTI) of the second cell and (ii) an ID of the first cell is transmitted to the second cell.

13. The UE of claim 12, wherein after a radio link failure (RLF), a handover failure, a reconfiguration failure, or a security check failure occurs, the second cell is selected by the UE.

14. The UE of claim 12, wherein the UE communicates with at least one of a mobile terminal, a network or autonomous vehicles other than the UE.

15. The UE of claim 12, wherein, based on (i) the second cell not being included in the list of cells and (ii) the information representing that the second cell does not support the RRC connection resume for re-establishment, the UE determines that the resume ID is not valid for the second cell.

16. The UE of claim 12, wherein, based on the second cell being included in the list of cells, the UE determines that the resume ID is valid for the second cell.

17. The UE of claim 12, wherein the processor is further configured to:
control the transceiver to receive a validity timer for the resume ID,
wherein the UE determines whether the resume ID is valid for the second cell based on the validity timer.

18. The UE of claim 17, wherein the processor is further configured to:
initiate the validity timer,
wherein, based on the validity timer not expiring, the UE determines that the resume ID is valid for the second cell.

19. The UE of claim 18, wherein, based on the resume ID being received from the first cell, the validity timer is initiated.

20. The UE of claim 12, wherein the first cell is a source cell of the UE, and the second cell is a cell selected or a cell reselected by the UE.

* * * * *